Aug. 21, 1928.
J. M. BARR
1,681,915
DYNAMO ELECTRIC MACHINE STATOR
Filed Dec. 12, 1923
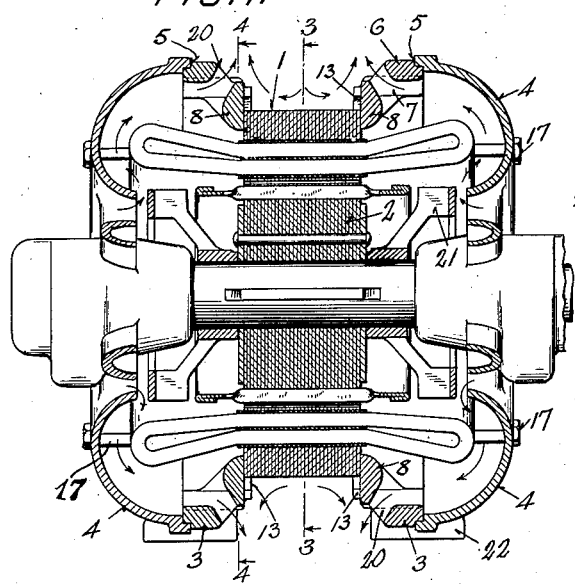
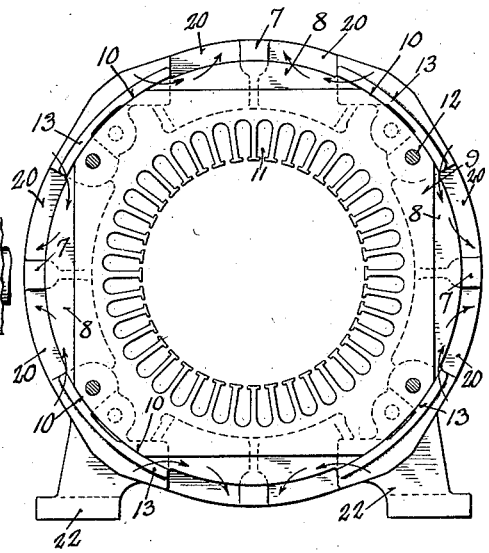
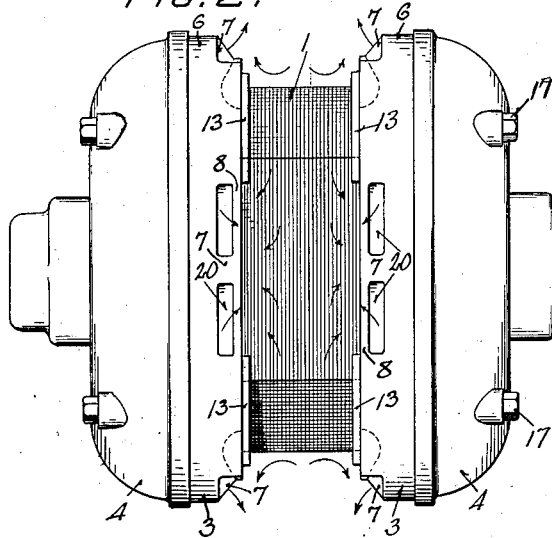
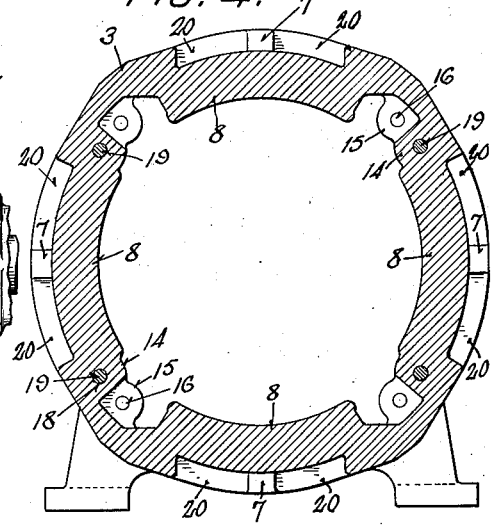
INVENTOR.
John M. Barr
BY
Edwin B. H. Tower, Jr.
ATTORNEY.

Patented Aug. 21, 1928.

1,681,915

UNITED STATES PATENT OFFICE.

JOHN M. BARR, OF MILWAUKEE, WISCONSIN, ASSIGNOR TO THE LOUIS ALLIS COMPANY, OF MILWAUKEE, WISCONSIN, A CORPORATION OF WISCONSIN.

DYNAMO-ELECTRIC-MACHINE STATOR.

Application filed December 12, 1923. Serial No. 680,160.

This invention relates to a dynamo electric machine stator.

The stator to which this invention applies is provided with separate end frames, a core arranged between these frames and having a central opening for the rotor, and an end casing carried on each end frame and having a bearing for the rotor shaft.

The object of this invention is to facilitate ventilating the stator and cooling its core.

Another object of the invention is to provide a stator which is strong, sturdy and compact and which may be readily and economically manufactured.

According to the invention, the stator comprises a core, an end frame engaging each end thereof and having discharge passages therethrough to discharge air away from the core and cause external air to circulate upon the outside thereof.

The stator set forth herein is a modification of the invention set forth and claimed in co-pending application, Serial No. 693,615, filed February 18, 1924.

The accompanying drawings illustrate a dynamo electric machine having a stator embodying the invention, and the views therein are as follows:

Fig. 1 is a longitudinal section of a dynamo electric machine.

Fig. 2 is a plan view of the machine.

Fig. 3 is a vertical section on line 3—3 of Fig. 1 with the rotor, field winding and end casing removed.

Fig. 4 is a similar section on line 4—4 of Fig. 1.

The machine in which the stator may be employed has a stator core 1, a rotor 2, and means to hold them in concentric relation.

The stator core is held between end frames 3 and the rotor is held by bearings in end casings 4 carried by the end frames.

The end frames have outward lateral flanges 5 arranged on a circular member 6 to receive and hold the end casings, and ribs 7 extending diagonally inwardly to support cross bars 8 which engage the stator core.

The stator core 1 may comprise square laminations 9 rounded at the corners.

The laminations 9 may be punched from sheet metal and may have rounded corners 10 which are arcs of a true circle. Simultaneously, the slots 11 for the winding and holes 12 may be punched, thus insuring a true axis for the stator members.

The bars 8 are provided with flanges 13. These flanges may be shaped by a tool into arcs of a true circle corresponding to arcs 10 of the laminations.

The faces of bars 8 adjacent the stator core 1 may be roughened by a tool to increase the frictional contact between the face of the core and of the bars 8. This roughened surface may be supplemented or substituted by water glass or other abrasive or adhesive substance to increase the frictional resistance between the faces of the core and the end frames.

The flanges 5 may be shaped by a tool as well as the corresponding flanges on the end casings 4.

The end frames 3 are provided with lugs 14 and 15. Lugs 15 are provided with threaded openings 16 for receiving the bolts 17 which pass through the end casing 4.

The lugs 14 are provided with holes 18 corresponding to holes 12 of the laminations for passing rivets 19 through the end frames 3 and through the stator core laminations to fasten the end frames 3 and the stator core laminations into a compact unit.

In assembling, one frame 3 is laid face upward with rivets 19 passing therethrough. The laminations are then assembled on the rivets, and the other end frame placed thereon. An expansible mandrel which may have flanges to fit the end frames is placed inside the laminations. A slight pressure is applied to this assembly and the mandrel expanded to align the stator core and the frames. Great pressure is then applied and the metal of the rivets 19 turned.

After the laminations and end frames have been assembled, the assembly may be mounted on a mandrel and the flanges 5 cut by a tool to planes perpendicular to the axis of the assembly. Sufficient material is provided on the end frames 3 so that the flanges 5 may be machined to planes perpendicular to the axis of the assembly.

Slight irregularities in the thickness of the laminations or end frames, which might cause the ends of the assembly not to be parallel or at right angles to the axis of the assembly may be compensated for by cutting the flanges 5 at right angles to the axis of the assembly.

This structure is very rigid and compact. The relatively large frictional areas presented by the several laminations to each other within the body of the stator core are sufficient to hold the laminations from radial displacement under the pressure of the rivets. The smaller frictional areas of contact between the end laminations and the end frames 3 are supplemented by flanges 13, thus preventing radial displacement between the stator core and end frames.

The members 8 and the peripheral portions 6 form openings 20 which are directed outwardly with respect to the periphery of the stator core.

These openings 20 terminate at a distance from the surface of the stator core, and as will be seen from the drawings, the air forced through these openings by fans 21 will induce an air current to move over the stator core 1. As shown in Figs. 2 and 3, these openings may not be continuous around the frame 3 and may be adjacent the sides of the square stator core 1, thus allowing the cool air to enter at the corners of the stator core.

The induced air currents find their way to the face of the stator core at the corners thereof and travel towards the openings in the frames 3 and are then forced away from the machine by the current from fan 21. The air traveling over the face of the stator core is not the warm air which has been passed through the interior of the machine but is the cool air which surrounds the machine.

The end frame 3 may be provided with feet 22 for supporting the machine.

By reason of the flanged construction between the frame 3, the stator core 1, and the end casings 4, radial displacement of the stator core with respect to the rotor is prevented, the flanges 13 supplementing the small frictional contact between the end laminations of the stator core and the frame 3.

While one embodiment of the invention has been shown, it is obvious that other forms are equally adaptable to the invention.

What I claim is:

1. A dynamo electric machine stator comprising a core, an end frame engaging each end thereof and having passages therethrough formed to direct discharged air outward and away from said core and cause external air to circulate upon the outside thereof, and an end casing carried by each end frame.

2. A dynamo electric machine stator comprising a core, an end frame having continuous engagement with each end thereof and provided with passages therethrough formed to direct discharged air outward and away from said core and cause external air to circulate upon the outside thereof, and an end casing carried by each end frame and having continuous engagement therewith.

3. A dynamo electric machine stator comprising a substantially square core, an end frame arranged on each end thereof and having passages therethrough formed to direct discharged air outward and away from said core and cause external air to circulate upon the outside thereof, inward lateral flanges formed on said end frames to engage said core at the corners thereof, and an end casing carried by each end frame and having an air inlet passage.

In witness whereof, I have hereunto subscribed my name.

JOHN M. BARR.